United States Patent
Wewalaarachchi et al.

(10) Patent No.: US 9,349,107 B2
(45) Date of Patent: May 24, 2016

(54) COMPUTER IMPLEMENTED METHOD AND SYSTEM FOR INTEGRATING MULTIPLE BUILDING SYSTEMS AND BUSINESS APPLICATIONS

(75) Inventors: Bandu Wewalaarachchi, Singapore (SG); Haritharan Gunasingham, Singapore (SG); Haran Shivanan, Singapore (SG)

(73) Assignee: EUTECH CYBERNETIC, Singapore (SG)

(*) Notice: Subject to any disclaimer, the term of this patent is extended or adjusted under 35 U.S.C. 154(b) by 0 days.

(21) Appl. No.: 12/952,675

(22) Filed: Nov. 23, 2010

(65) Prior Publication Data
US 2012/0095600 A1 Apr. 19, 2012

(30) Foreign Application Priority Data
Sep. 23, 2010 (SG) ................. 201006967-2

(51) Int. Cl.
*G05B 15/02* (2006.01)
*G06Q 10/00* (2012.01)

(52) U.S. Cl.
CPC ........ *G06Q 10/00* (2013.01); *G05B 2219/2614* (2013.01); *G05B 2219/2642* (2013.01)

(58) Field of Classification Search
USPC ........................................................ 700/275
See application file for complete search history.

(56) References Cited

U.S. PATENT DOCUMENTS

| | | | |
|---|---|---|---|
| 6,477,434 B1* | 11/2002 | Wewalaarachchi et al. | 700/83 |
| 7,870,090 B2* | 1/2011 | McCoy et al. | |
| 7,904,186 B2* | 3/2011 | Mairs et al. | 700/83 |
| 2003/0109951 A1* | 6/2003 | Hsiung et al. | 700/108 |
| 2006/0005124 A1* | 1/2006 | Speicher | 715/514 |
| 2009/0077624 A1* | 3/2009 | Baum et al. | 726/1 |
| 2010/0324962 A1* | 12/2010 | Nesler et al. | 705/8 |
| 2011/0055748 A1* | 3/2011 | Vacariuc | 715/771 |

FOREIGN PATENT DOCUMENTS

EP 1521401 4/2005

OTHER PUBLICATIONS

Supplementary European Search Report issued Feb. 6, 2014 in corresponding European Application No. 11827067.7.

* cited by examiner

*Primary Examiner* — Sean Shectman
(74) *Attorney, Agent, or Firm* — Whiteford, Taylor & Preston, LLP; Peter J. Davis

(57) ABSTRACT

A computer-implemented system and method by which an end user can monitor and manage multiple building systems with a single interface as well as customize and revise the settings and automated responses for multiple building systems based on input and transactions from multiple different building systems and enterprise applications. The invention takes the data and control functions from any and every control system and allows a user to build his or her own intelligent building, and to edit the control processes on their own at any time. The responses of building systems are process driven, rather than rules based, and the response process is fully editable by the end user. The system allows for multiple processes for a given input, depending, for example, on the location of the sensor providing the input.

15 Claims, 17 Drawing Sheets

| Personal Agent Framework (Portal Layer) | Personal Agent |
|---|---|
| | Presentation Cells |
| | Service Agents |
| Virtual Application Service (Meta-Data Layer) | Object Server & Data Objects |
| | Application Cells |
| | Communications Gateway |
| | Device Network |
| | Field Device | Field Device | Control Application | Control Application |

FIG. 1

| Process Milestones | |
|---|---|
| Process Name | Card Access Denied |
| Process Started: | 12/3/2010 4:20pm |
| Current Stage | Notify Card Owner |

| Milestone | Date |
|---|---|
| Started | 12/3/2010 4:20 pm |
| Notifications Sent | 12/3/2010 4:22 pm |
| Acked | 12/3/2010 4:26 pm |
| Manually Opened | 12/3/2010 4:27pm |

FIG. 15

COMPUTER IMPLEMENTED METHOD AND SYSTEM FOR INTEGRATING MULTIPLE BUILDING SYSTEMS AND BUSINESS APPLICATIONS

BACKGROUND OF THE INVENTION

This invention relates to supervisory control and data acquisition (SCADA) systems generally. More particularly, this invention relates to a method and system for user-customizable and process-driven integration of the control and response features of various independent and unrelated building systems and business applications.

BRIEF SUMMARY OF THE INVENTION

Computerized systems for monitoring, diagnosing, operating and controlling the operations of a wide variety of facilities, including factories, power plants, warehouses, office buildings, apartment buildings, shopping centers and parking facilities are known. In such Supervisory Control and Data Acquisition (SCADA) systems, microprocessor devices convert device measurement and status inputs into computer data for logging and transmission to higher level processors. These supervisory processors make rules-based logical decisions for the operation of a subsystem or subsystem device and send out set points to dedicated controllers which make the changes to actuators. The SCADA network therefore connects to many controllers and field devices to gather information and make rules-based logical decisions. These SCADA systems typically integrate a large number of control devices through a number of diverse control networks. For example, there may be security, fire protection, heating, cooling, electrical and elevator control systems. U.S. Pat. No. 6,067,477 describes a computer integrated SCADA system for managing distributed field devices that control or monitor physical or logical entities and for providing users the ability to construct personalized SCADA applications. The computer controlled system provides real time continuous operational control by monitoring data received from one or more remote device sensors and actuating at least one of the plurality of control devices based on input from said remote sensors. Other building, site, entity management, and enterprise systems and applications exist including telephone, computer network, reservation/scheduling, appointment/calendar systems, public address, intercom, and document management systems, but these systems have not been included in or integrated with traditional SCADA systems. As-built integrated systems are known in which, for example, fire control systems are linked to the security system so that fire doors are automatically unlocked when a fire alarm is sounded. Other systems have been similarly linked in relatively simple and direct fashion. However, all of these system linkages are completed manually and at the time of installation, and such linkages are not readily scalable or expandable to include other systems that were not part of the original installation. Moreover, the programmed responses of one system to data or input from the same or different system in prior art systems are purely rules-driven. In other words, all responses are hard programmed into the system, and consist primarily of "if x, then y" instructions. These instructions, or "rules," are set up by the system engineer when the system is installed, and the end user, i.e., building tenant, building supervisor or maintenance engineer, has no way to update, modify or delete the rules. Additionally, since prior art SCADA systems do not integrate enterprise systems, there has been no way for end-users to configure building systems to respond according to input from or data and information resident in enterprise systems. Specifically, traditional SCADA system information management schemes are not compatible with traditional enterprise application data and data formats.

The present invention provides a computer-implemented system and method by which an end user, for example, a building superintendent, maintenance technician, or even a tenant, can easily not only monitor and manage multiple building systems with a single interface, but in which the user can easily customize and revise the settings and automated responses for multiple building systems based on input and transactions from multiple different building systems and enterprise applications, even when the building systems, when installed, have had no connection or programmed interaction with other building systems or enterprise applications. Stated another way, under presently available systems, a building manager or tenant can program a first building system to react to a second building system or enterprise application status, information, transaction, or alarm, only if the first building system was designed and installed to work together with a second building system and/or enterprise application and with a specially designed and installed pre-integrated control system. However, if the building manager or tenant desires to program or configure a third building system to respond in a specific way based on the information, status, transaction, alarm or change in status in the first or second system building system, or in an enterprise application, he or she has no way of doing so. Indeed, the only way to integrate a previously un-integrated building system with another building system, or with an enterprise system, is to remove both systems and re-install two pre-integrated systems. Alternatively, while it might be technically possible to build, in-situ, an integrating interface that specifically receives the reports, status, alarms, and transactions of two or more building systems and/or enterprise applications and allows a user to program the responses and actions of one system based on the input of another system, such in-situ retrofit of an integrated command interface between two or more pre-existing building systems and/or enterprise applications has not been considered economically feasible as compared to reinstallation of pre-integrated systems.

Notably, while sophisticated prior art SCADA systems can receive the data, input, alarms, etc., from multiple building systems and allow users to configure each of those multiple building systems, no prior art SCADA system has had the capability to permit an end user to use data from one building system as an input for the control of another building system, unless as mentioned above, the two building systems were installed together with an integrated control system. Moreover, no prior art SCADA system has had the capability to permit an end user to use data from enterprise applications as input for the control of a building system based on business requirements, and to easily revise the response features of building systems as business requirements change.

Accordingly, the present invention provides a drop-in command and interface software module that allows a user to integrate control, command and response functions between previously installed and un-integrated building systems without the need for expensive and time-consuming retrofits of actual physical equipment. Thus, the present invention allows the user to configure the activation or deactivation of one system function based on the data, alarm, event, or transaction from one or more other systems. Moreover, as additional or replacement systems are added to a building's systems, the present invention can easily accommodate the new additions without reconfiguring the entire control system. In short, the present invention takes the data and control functions from any and every control system and allows a user to build his or her own intelligent building, and to edit the control processes on their own at any time. The building systems and enterprise applications that can be integrated with this invention include, but are not limited to, heating, ventilation, and air conditioning ("HVAC"), fire control, access control, video monitoring, public address, exterior lighting and signage, interior public and private space lighting, escalator and elevator systems, telephone systems, room scheduling/reservation systems, resource management systems, data and information technology systems, document management systems, e-mail servers, fax servers, short message service ("SMS") servers, building tenant/visitor database systems, and customer relationship/management systems.

According to another aspect of the invention, the responses of building systems are process driven, rather than rules based, and the response process is fully editable by the end user. For example, when the SCADA system receives data from a remote sensor indicating that smoke has been detected, the system of the invention launches a process, which process has been designed by the user, rather than simply and automatically triggering an audible alarm and sending a notification to the fire department. For example, according to the invention, an end user can design a smoke detection response process according to which the system queries various systems to determine whether any persons are currently occupying the space where smoke has been detected. The system can also query the HVAC system to determine whether there has been a rise in temperature in the area where smoke has been detected. The system can be programmed to make various other queries to verify the signal, determine its scope and severity, and determine what personnel and resources are at risk. Based on the data received based on any one or more of these inquiries, the system can be programmed to command various systems in various ways—for example, the security system can be commanded to prevent entry into the space; the HVAC system can be commanded to close or divert air flow into or out of the affected area, and various persons can be alerted. The system can be programmed to wait for end user intervention before an alarm is sounded, for example, if based on the queries, the threat level doesn't meet a particular threshold. And all of these queries and responses are full customizable and editable by the end user. At any time, the end user can add or delete steps to the response process using the systems process design interface.

According to another aspect of the invention, the system allows for multiple processes for a given input, depending, for example, on the location of the sensor providing the input. That is, the process that is launched when one smoke detector (for example a smoke detector located in a conference room) detects smoke can be completely different from the process that is launched when another smoke detector (for example, a smoke detector located in the parking garage) detects smoke. This goes for each sensor in the system. A completely different process may be programmed for launch for every individual sensor. For example, one tenant may want a very simple response process when smoke is detected in its tenant space. Another tenant in the same building may want a more complex, or in any event, a different process, launched when smoke is detected in its tenant space. According to the system of the invention, each tenant in a building may program the building system response processes according to its own business needs and management policies.

According to a further aspect of the invention, the present invention accommodates input from both value-oriented systems (also referred to as point-oriented systems) and transaction-oriented systems (also referred to as event-oriented systems). Value or status-oriented systems monitor and/or control the state of something, typically based on a value or threshold. Value or status-oriented systems include fire control systems; HVAC systems, etc. In these systems, values or statuses are set and/or monitored, and action is only taken when a status or value changes. Transaction or event based systems are systems that monitor and allow (or prevent) transactions or events. More specifically, transaction or event-based systems have a much richer and more complex data set. Transaction or event-based systems maintain a data record of system transactions or events, which data record includes, for example, the date of the event or transaction, the time of day of the transaction, the location of the event or transaction, and, in the instance of entry control, the identity of the access card that triggered the event or transaction, and the person to whom the access card is assigned. Prior Art SCADA systems allowed for the integration of multiple value or point-oriented systems using the common object model (although not for end-user configuration of response settings), but they did not allow for the integration of value-oriented systems with transaction based systems because the address space (the data record) for a transaction-based system is constantly growing, whereas the address-space for a point-oriented is fixed. That is, a point-oriented system can be easily programmed to communicate with another point oriented system because the addresses for each system are fixed. Not so for a transaction-based system. Accordingly, the inventors saw a need to develop a way to allow for the integration of point-oriented building systems and transaction-oriented building systems and enterprise applications. The present invention therefore provides a system and method for integrating both point-based building systems and transaction-based building systems and enterprise applications and the end-user building, configuration, and customization of response processes using input from both value- and transaction-oriented systems.

A more detailed description of features of the invention is set forth below in the detailed description of the invention, with reference to the figures. While this invention is described with respect to building systems (e.g., HVAC, fire control, etc.) and enterprise applications (e.g., calendar applications, reservation applications, e-mail application, document management applications, database management applications), this invention is intended to also apply to the integration, and customizable control of response processes for other infrastructure and/or municipal management systems, such as traffic lights, water fountains, police and fire communication/dispatch systems, as well as to administrative applications which are building-specific, for example, tenant management applications, etc. The following detailed description of the invention is not intended to limit or exclude these embodiments from the invention.

BRIEF DESCRIPTION OF THE DRAWINGS

FIG. 1 is a representation of prior art SCADA systems, having a portal layer, a data layer and a device and application layer.

FIG. 15 is a representation of a list of process milestones that might be presented to a user upon request for status of a particular process.

DETAILED DESCRIPTION OF THE INVENTION

Figure 2:
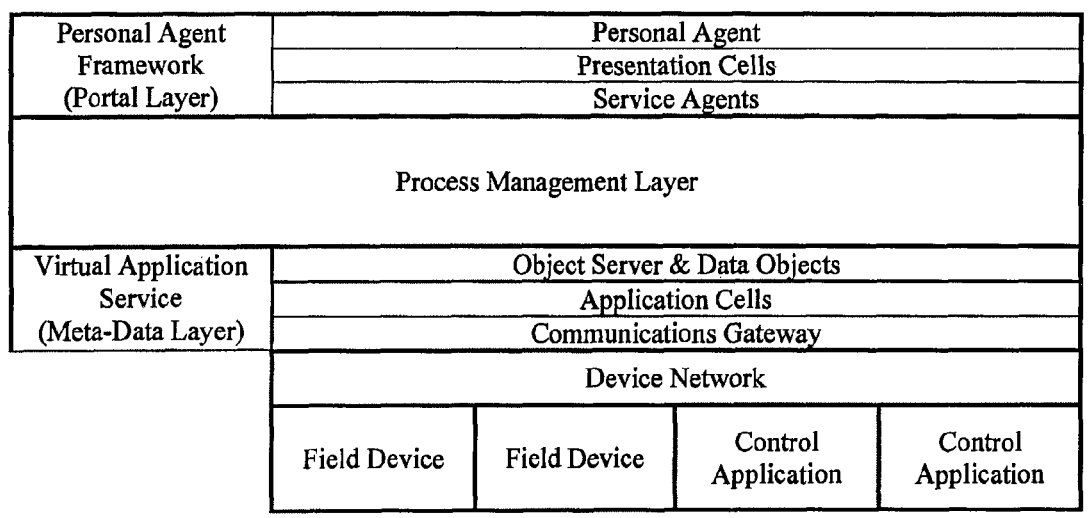
FIG. 2 is a representation of a SCADA system according to the invention, in which a process management layer resides between the portal layer and the data layer.
Figure 3:
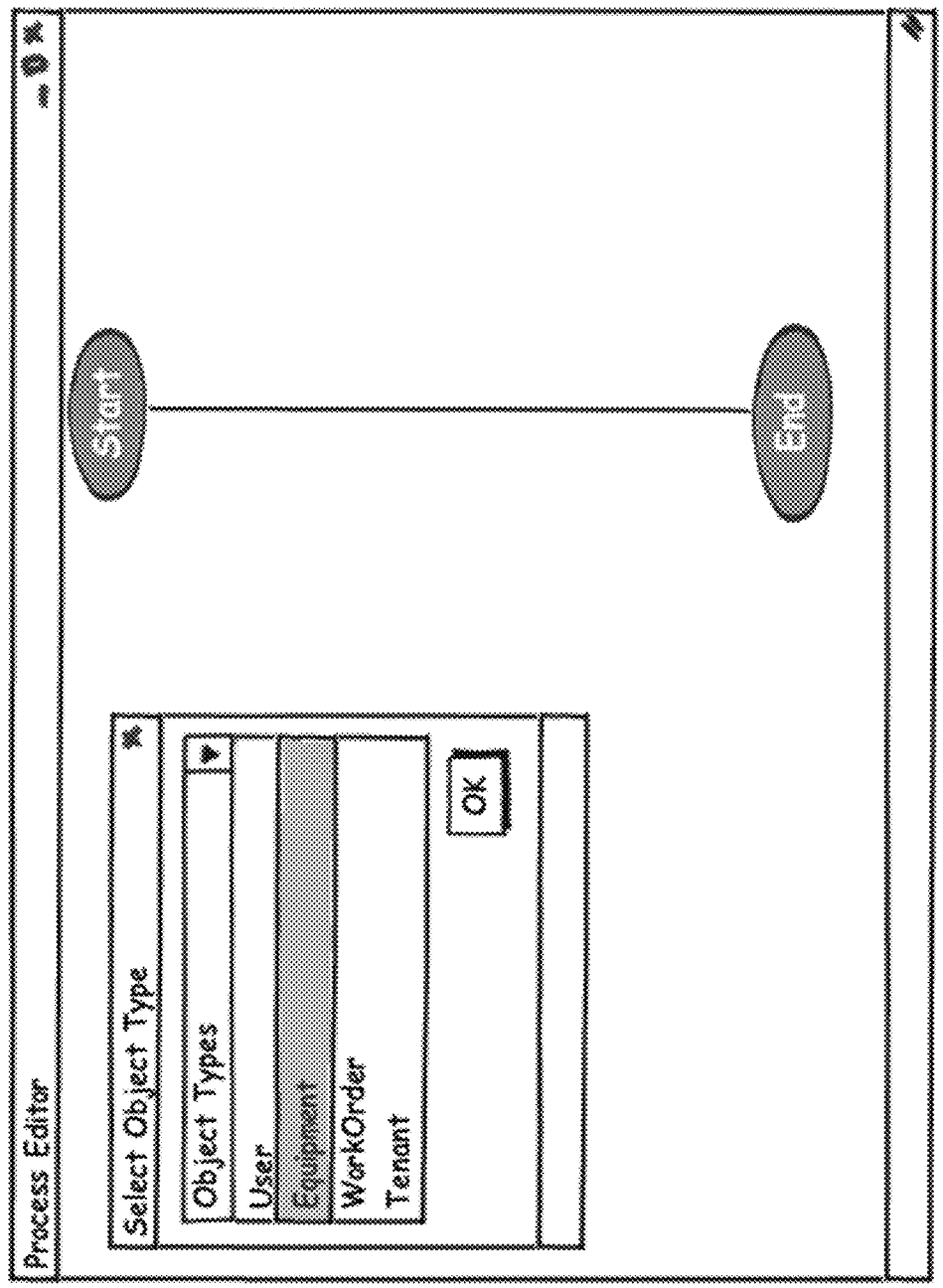
FIG. 3 is a representation of an early step in a user interface for a process editor according to which an end user might build or edit a response process according to an embodiment of the invention.

FIG. 2 shows a SCADA system according to the invention in which the process management system of the invention resides between the portal layer and the meta data layer. Field devices, control applications and enterprise applications constitute the device and application layer. Data and information from various and diverse field devices and control applications are represented and stored in the SCADA system at the meta data layer according to known methods and systems. According to the invention, data and information from various enterprise applications are also represented and stored in the SCADA system at the meta data layer. The portal layer includes applications and interfaces for logging onto and accessing the SCADA system, once again according to known methods and systems. However, where, according to the prior art, a user would use the portal layer to monitor, query, and command each device and application separately, the present invention provides a process management layer which comprises an interface module which communicates with the portal layer, a process configuration module which an end user accesses via the interface module and which guides the user through device selection and response process configuration, and (what) which stores the configured process and which executes process launch and process monitoring when there is a particular status change, event or transaction at a field device or control or enterprise application at the device and application layer. System access and process configuration by an end user, as well as process launch and execution upon a status or event trigger can be explained by way of example.

Generally, setting up an integration logic using a process involves the following steps: (1) identify the object, the activation of which is intended to cause a process to launch; (2) define the steps in the process using a process editor module; (3) define any filtering logic to qualify events as a process-triggering event; and (4) arm the process to be launched upon a given event for a given location.

EXAMPLE 1

System Access and Process Configuration

The present example describes how the user selects a device, and how a user goes about configuring a response process based on a particular status change/event/transaction. In particular, this example illustrates the response process configuration steps in the instance of an "card access denied event" in a card access entry/exit security system.

Defining the Process

To begin the configuration, the user opens a process editor module and selects the "object type" of the device, actor, or event for which the user wishes to configure a response process. Object types for which an end user can configure a response process include users, equipment, work orders, and tenants. In the case where the user wishes to configure a response process upon the trigger of a card access denied event, the user selects "equipment" from among the "object type" categories and then follows a series of menu prompts to select a category of devices, a subcategory of devices, or a single device, and a trigger event, for which to configure a response. In this example, the user selects a category of devices: "all card access devices", and selects "card access denied" as the event.

Once the object/device and event trigger are selected, the user begins the configuration of the response process. The system presents the user a menu of various work-performing steps, including "notifications," "actions," and flow-controlling steps such as "conditional branching", "delay", "waiting for a criteria to be set", "looping", "conditional termination", "capturing process variables" and "logging milestones."

Figure 4:
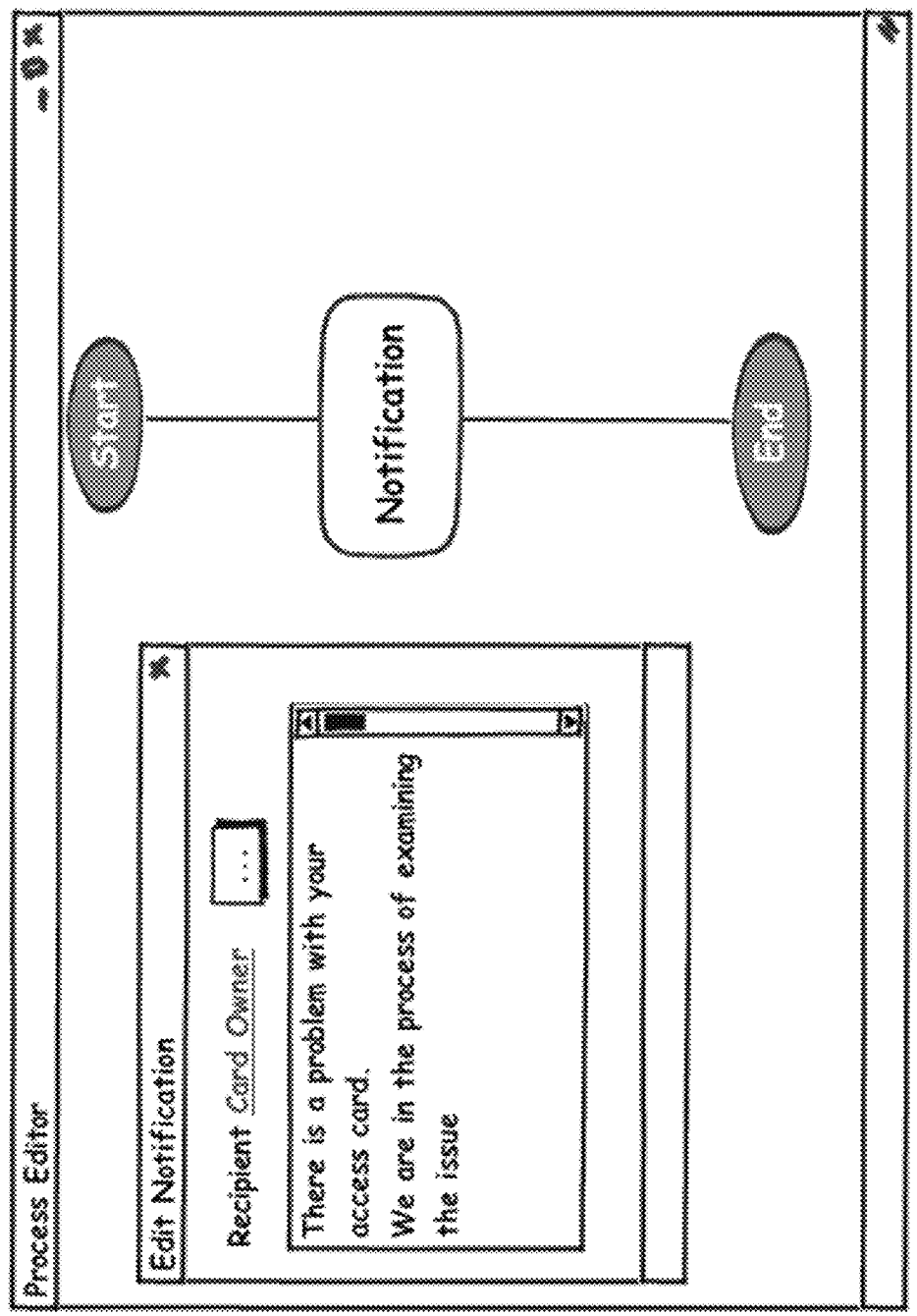
FIG. 4 is a representation of a first subsequent step in a user interface for a process editor according to which an end user might build or edit a response process according to an embodiment of the invention.
Figure 5:
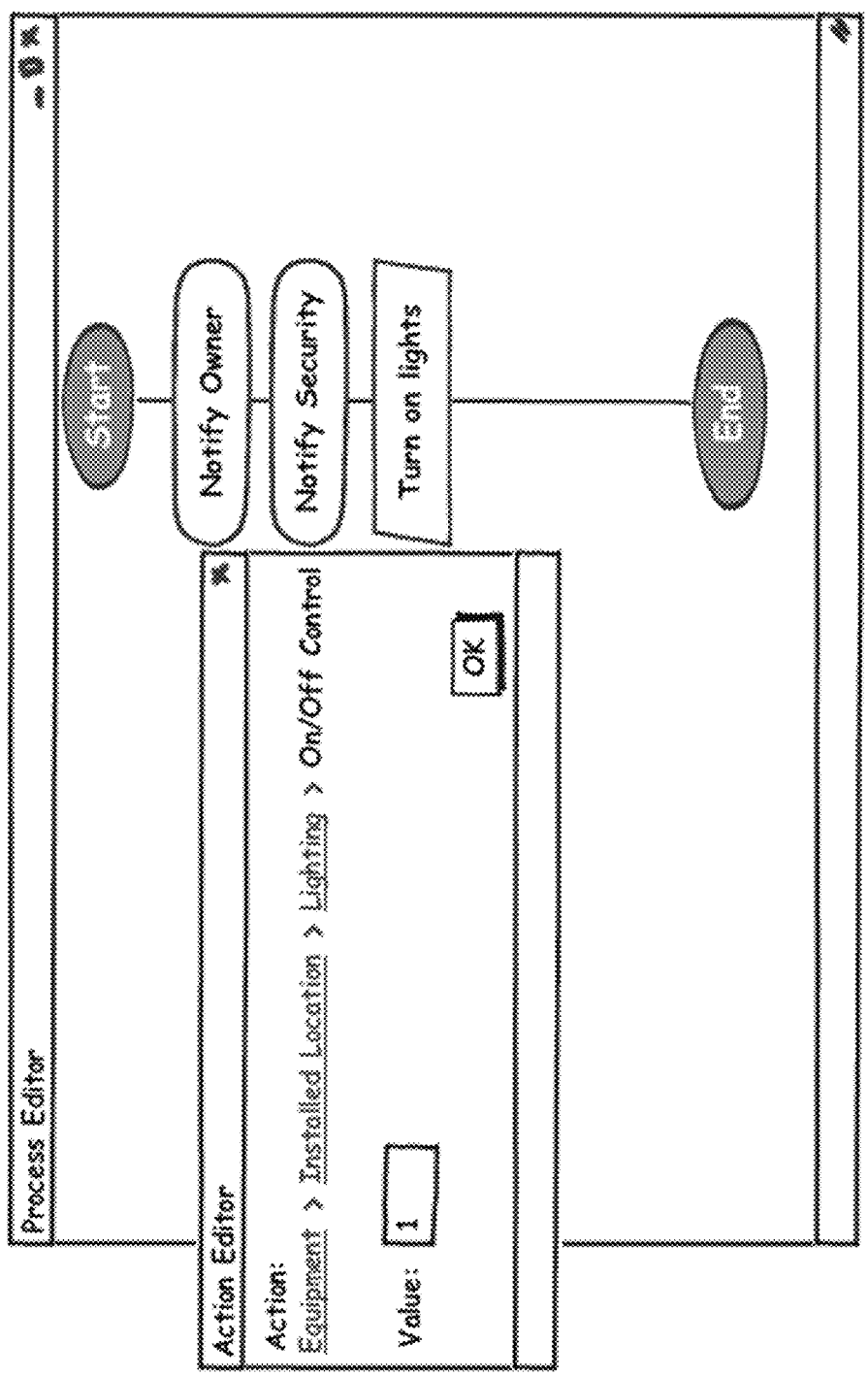
FIG. 5 is a representation of a second subsequent step in a user interface for a process editor according to which an end user might build or edit a response process according to an embodiment of the invention.
Figure 6:
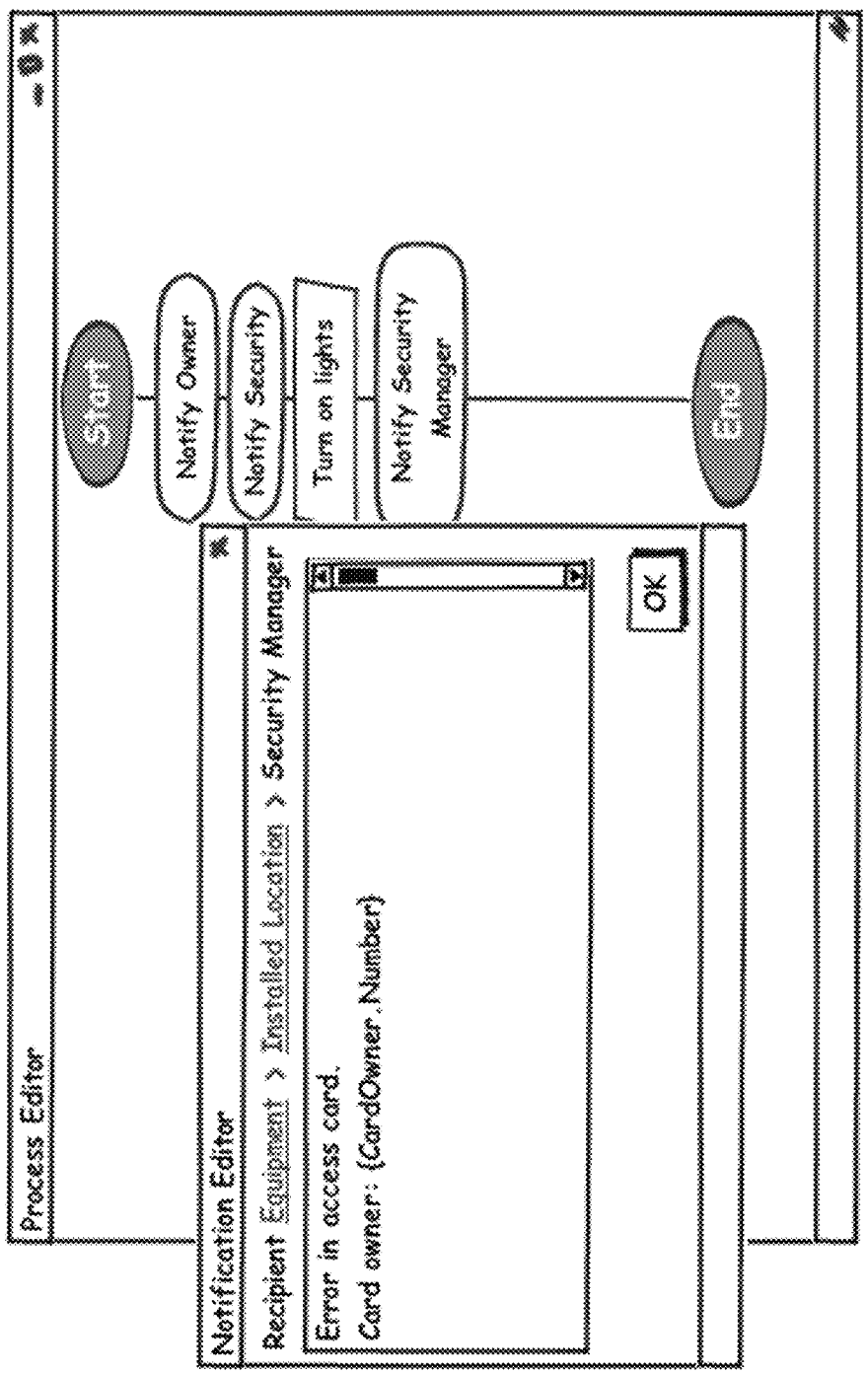
FIG. 6 is a representation of a third subsequent step in a user interface for a process editor according to which an end user might build or edit a response process according to an embodiment of the invention.

According to this example, the user selects as a first step in the process the notification of the card owner whose assigned card triggered the "access denied" event. The user may select "notification" as the action, specify the recipient of the notification, the mode of the notification, and even the text of the notification. See FIG. 4. The identity of the card owner would be part of the data that would be part of the triggering event. The user may also configure the system to make multiple notifications, as well. For example, in addition to notifying the card owner, the user may configure the system to notify the security station nearest the location where the card access denied event occurred. The notification to security might instruct them to view the door and the person trying to pass through the door and make a decision as to whether to open the door manually. In order to facilitate security's inspection of the door, the user might configure the process to access lighting control to turn on lights in the area surrounding the location where the card access denied event occurred. To accomplish this, the user would use the process editor to access lighting equipment control as shown in FIG. 5. According to this example, the user would configure an action to send "value 1" to "ON/OFF control" point of the "light" (equipment) in the "installed location" of the card reader. The user might also configure the system to send a notification to "security manager" of that location. As with the notification to the card owner and the security station, the notification to the security manager may be customized. For example, the user may configure the system to access the phone number of the card owner from enterprise systems and provide the card owner's phone number to the security manger so that the security manager can call the affected user. See FIG. 6.

Figure 7:
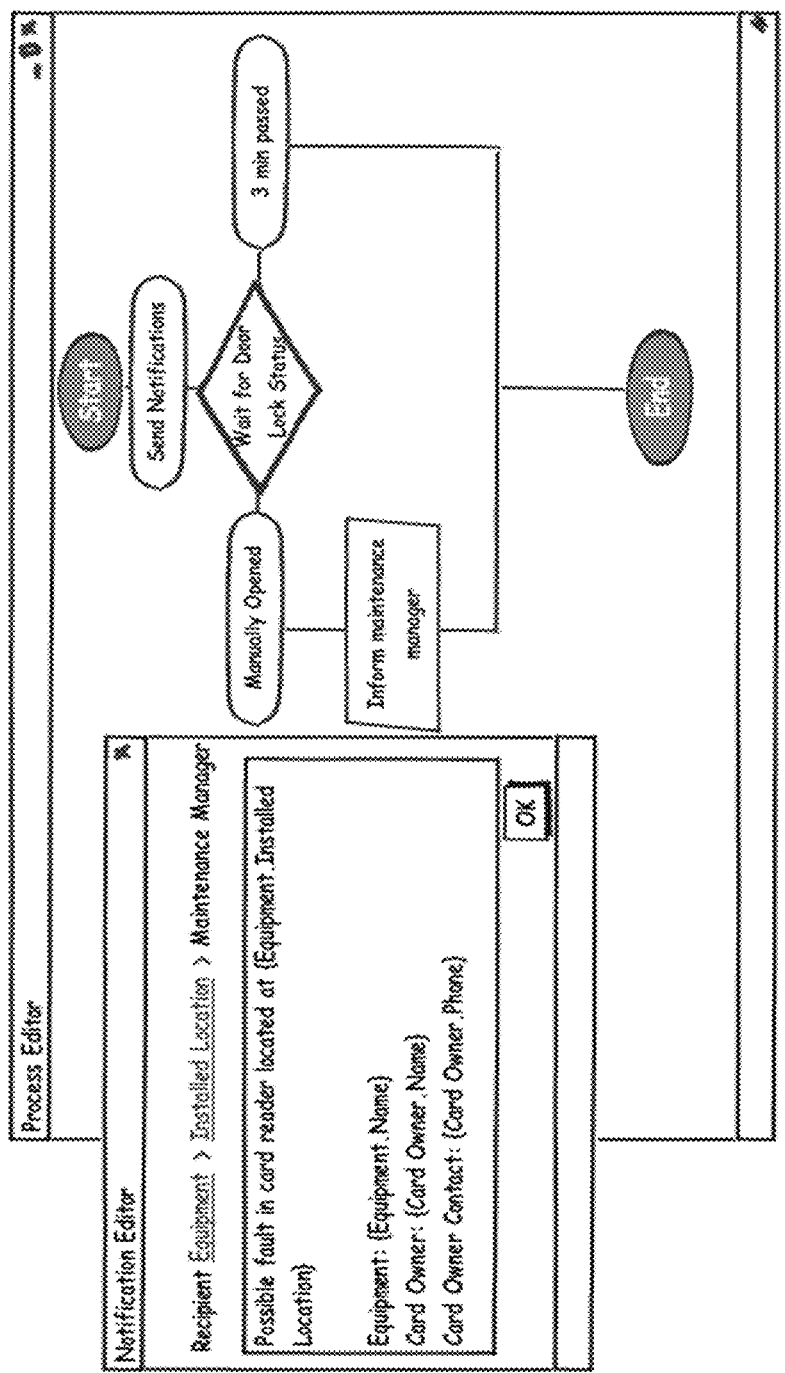
FIG. 7 is a representation of a fourth subsequent step in a user interface for a process editor according to which an end user might build or edit a response process according to an embodiment of the invention.

The user might then configure the process to determine whether the card access denied event is due to a malfunction, i.e., a maintenance problem. According to this step, the user might configure the process "wait for" (continually monitor) the "door lock status" for next 3 minutes. If the door is opened manually within that time, the system can be configured to conclude that the card reader is not functioning' properly, and send a notification to a maintenance manager of the problem and the location. See FIG. 7. The user can custom configure the message to the maintenance manager to reference potentially faulty equipment, the card reader in this case, as well as card owner whose card triggered the card access denied event. See FIG. 7.

Figure 8:
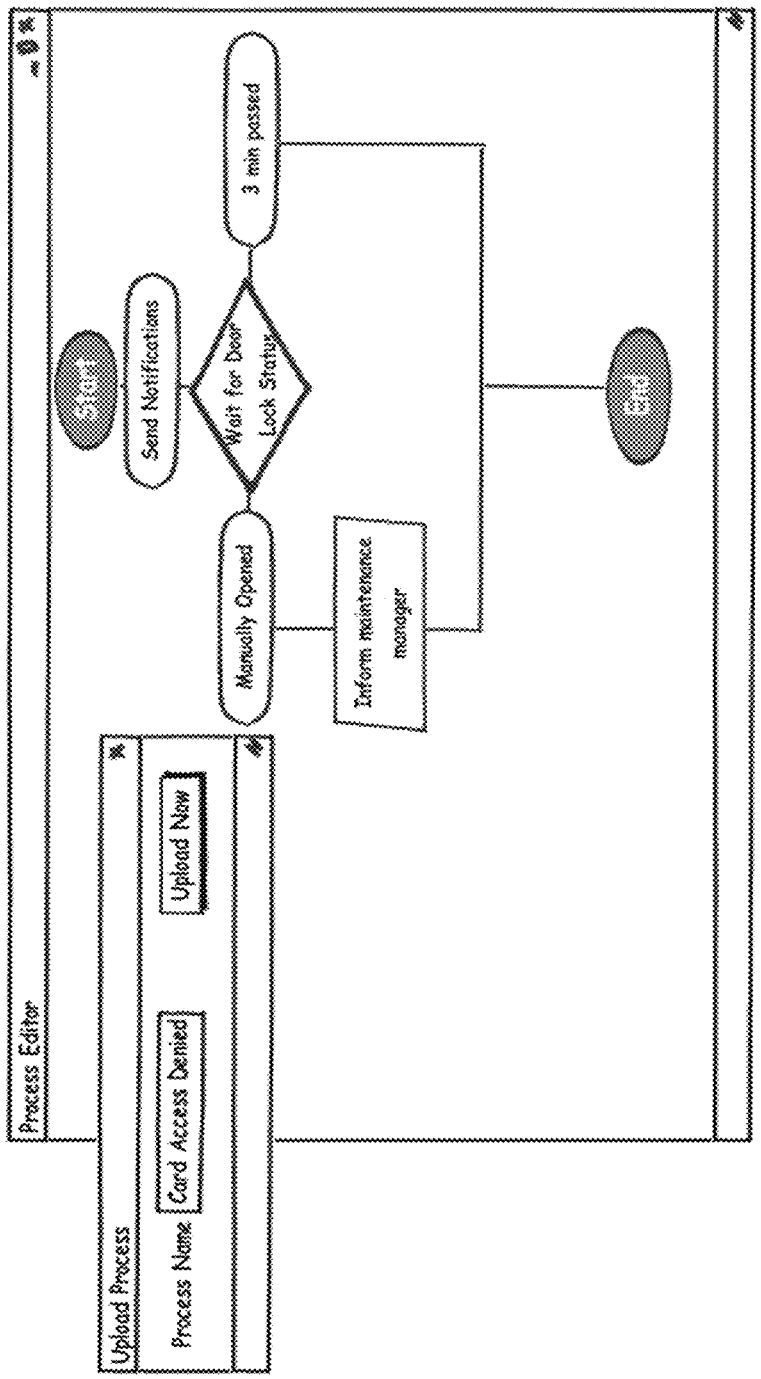
FIG. 8 is a representation of a fifth subsequent step in a user interface for a process editor according to which an end user might build or edit a response process according to an embodiment of the invention.

Once the user has added all the notifications, actions and (other steps) that are desired to be included in the response process, the user will identify the process with a "process name" and upload it to the system. In the case of FIG. 8, the configured process has been given the name "Card Access Denied." See FIG. 8.

Arming the Process for a Specific Location

Figure 9:
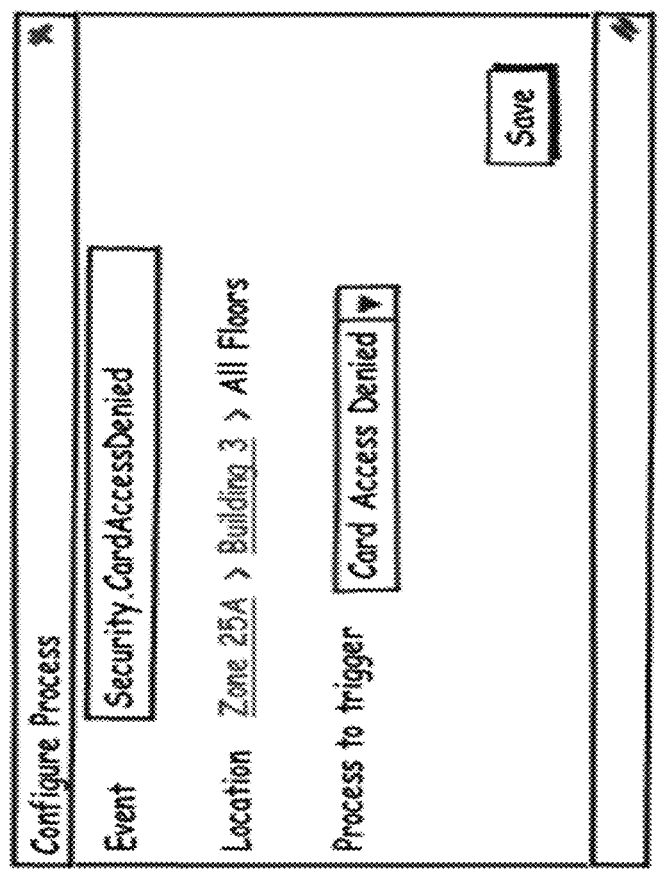
FIG. 9 is a representation of a sixth subsequent step in a user interface for a process editor according to which an end user might build or edit a response process according to an embodiment of the invention.

Once the user has configured and named a process, the user may then select the event for which the process is to be launched, and the location(s) where the event must occur in order for the process to be launched. In the case of FIG. 9, the user has configured the process "Card Access Denied" to be launched whenever the event "Security. CardAccessDenied" occurs anywhere in Building 3.

EXAMPLE 2

Status or Event Trigger and Process Launch

This example describes how the system of the invention operates according to a user-configured process when a particular status/event trigger occurs. Generally, when a triggering event occurs, the appropriate process(es) will be launched and a "process instance" will be created in the system for each process launched. The user can view the list of process instances running in a given location at any given time, and open any of the process instances to monitor its current status. The system will show current step of the process, as shown for example in FIGS. 14a and 14b.

Execution Steps: Determining Event Location

When an event is received by the system, the system first determines the "event location" through object relationships. For example, when a "card access denied" event is received, the event location is considered to be the "installed location of the card reader" that generated the event. However, there are situations where "event location" is not the physical location of the activity that triggered the event. For example, an "email received" event would consider the "location of the office" of the staff member who received the email.

Execution Steps: Locating the Process Definition

The system then uses the "event location" to locate the proper process definition to execute. There can be many process definitions that are qualified to act upon a "card access denied" event. Therefore, the system must locate the appropriate process definition for that particular event location.

First, the system checks if there is a Process Definition armed at the Event Location for this event. If so, it would be the correct process definition. If not, system then searches the "parent location" of the event location. System continues to search upwards the location hierarchy until a process definition is found.

Figure 10:
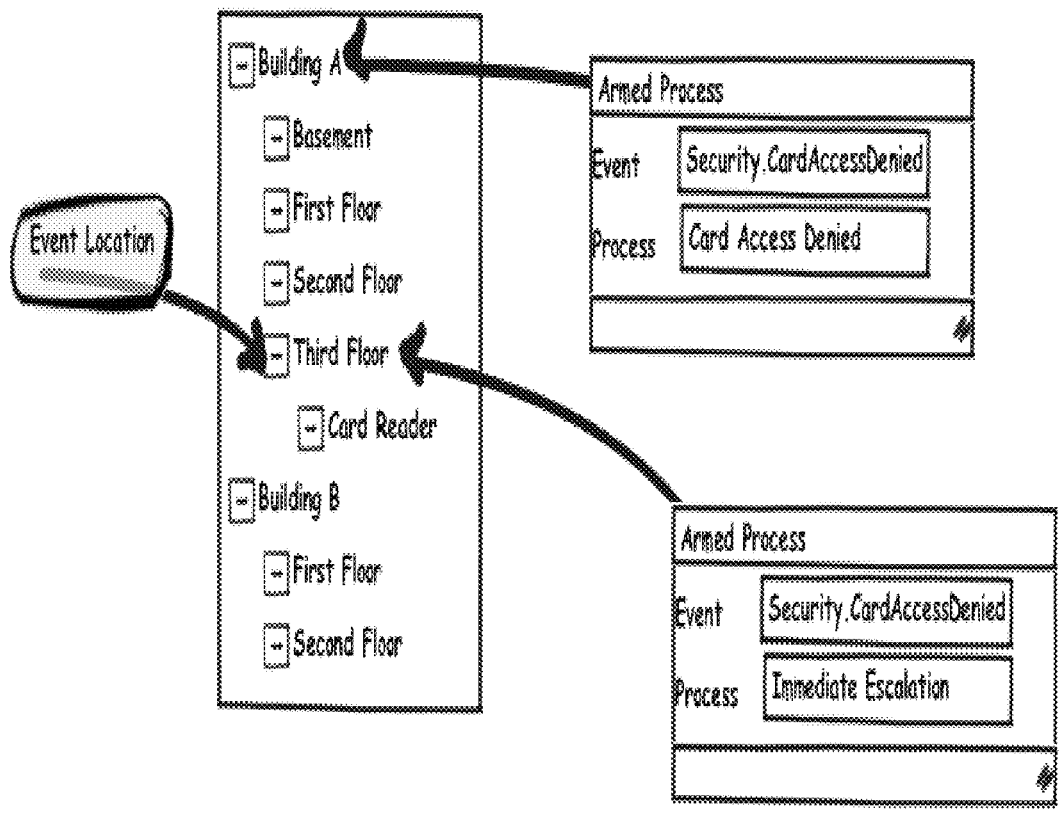
FIG. 10 is a representation of a building hierarchy and two different configured processes for the event "security card access denied" depending on the location of the event in the building hierarchy.

In effect, this allows a user to arm a process definition at the Building level to act upon all card access denied events happening anywhere in the building (without having to configure it at each floor). However, if a special treatment is necessary for the top floor where company directors are sitting, a special process could be armed only for the top-floor as an overriding process. So, if the event location is top-floor, special process will be executed whereas any other event would cause building-level process to execute. FIG. 10 shows an example of location hierarchy and one process definition at the building level and a separate process definition at the third floor level. In the event of a card access denied event on the third floor, the process named "Immediate Escalation" would be launched. Anywhere else in the building, the process "card access denied" would be launched.

Execution Steps: Creating Process Instance

Figure 11:
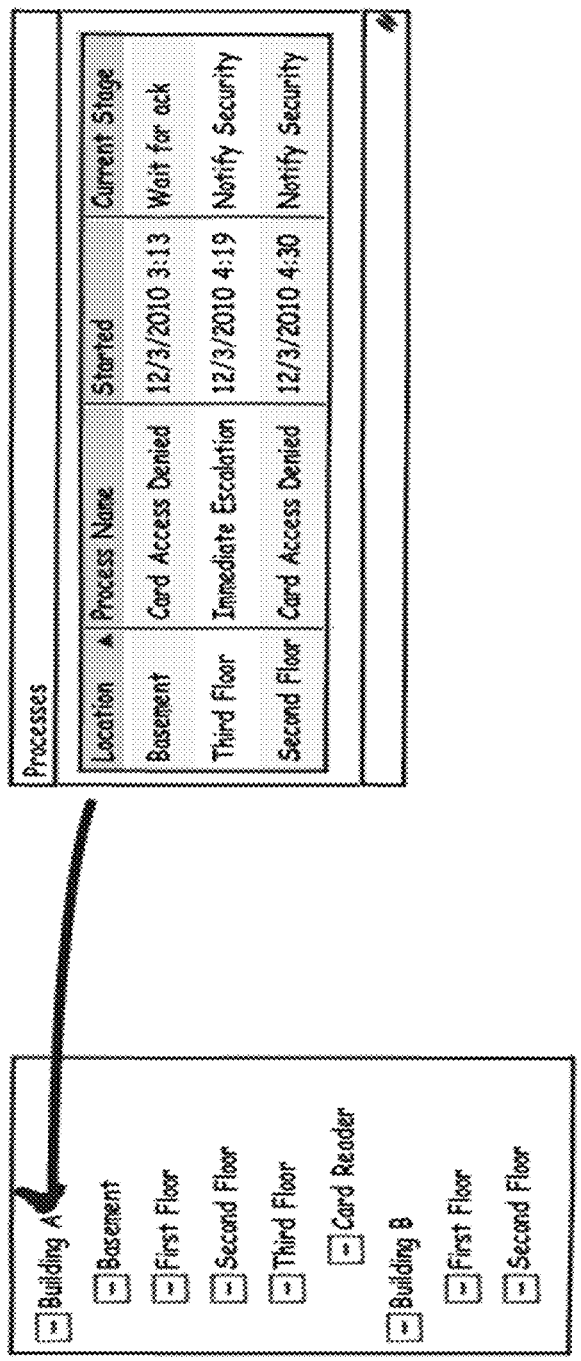
FIG. 11 is a representation of a building hierarchy and a status list of configured processes that might be under way at a given time for various triggering events.

Once the system has identified the appropriate process definition, the creates a "process instance" for that particular event. Each process instance is a "living entity" that is automatically programmed to follow the steps defined in the process definition. Each process instance will remember its last executed step, and keep executing the steps until it reaches the "end" step. FIG. 11 shows a list of active process instances for Building A, together with their current status.

Execution Steps: Executing Process Steps

Each process instance includes a record of its corresponding process definition along with additional data specific to that instance—such as last executed step, and the data came along with the event. The steps of the process instance are executed by the "process engine," an executable that periodically looks at process instances that require execution.

There are generally two kinds of process steps: (1) Queries and Actions, and (2) Flow Control. A "Query" means sending a request for some information (described in the query-data that goes along with the query). An "Action" means sending a request to perform a step such as modifying some data in the database or asking lighting control system to turn on lights.

Figure 12:
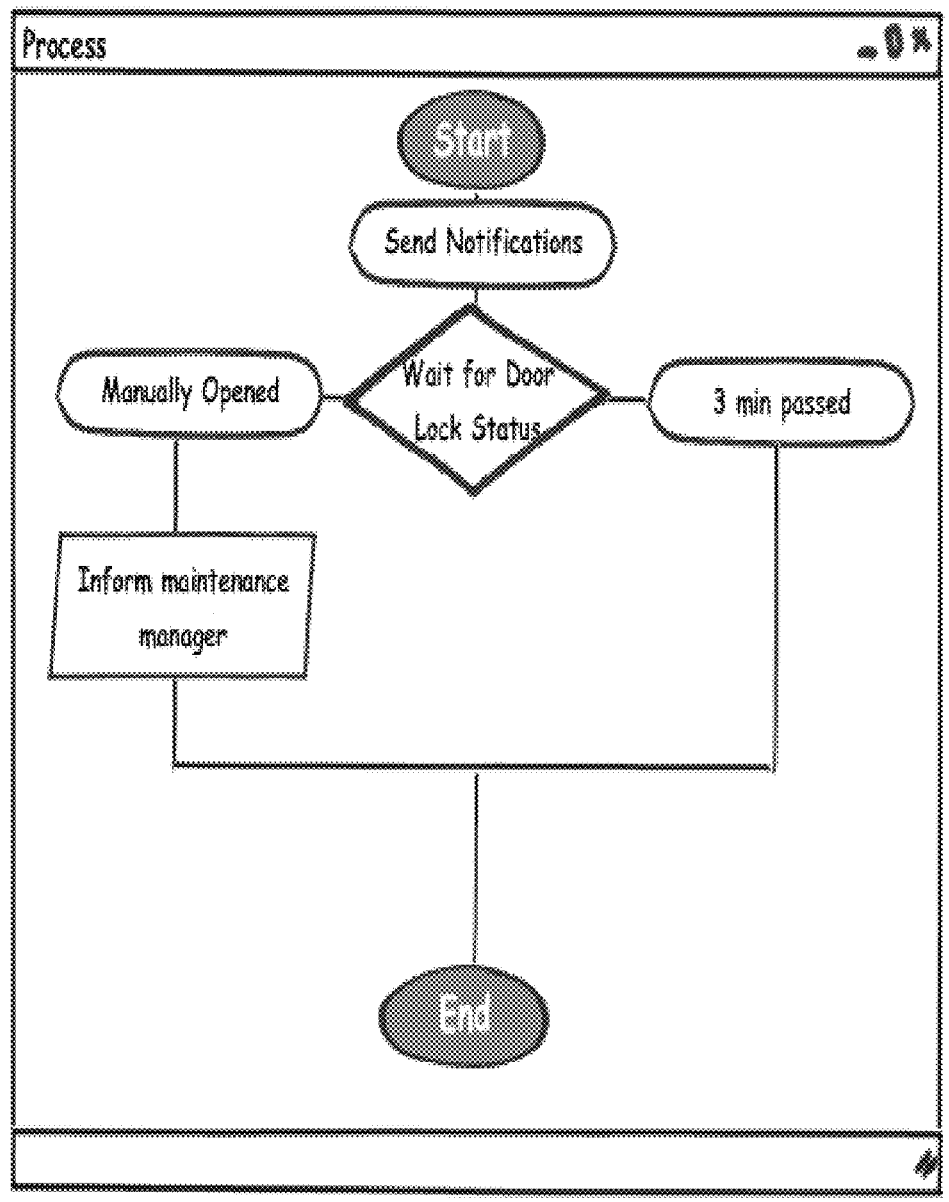
FIG. 12 is a representation of a set of process steps including a "wait for door lock status" flow control step.
Figure 13:
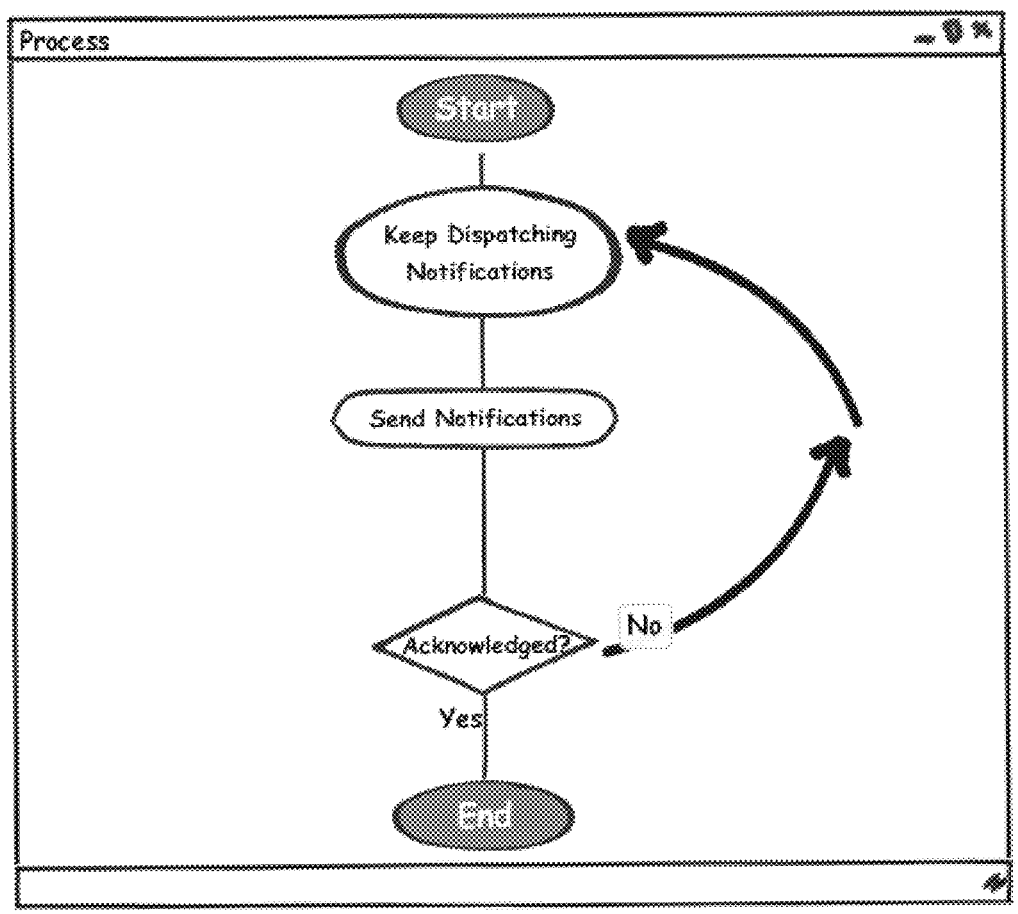
FIG. 13 is a representation of a set of process steps including a process loop set to wait for a condition to be satisfied before the next step in the process is executed.

Flow control steps set up the logical sequence of the process steps. These steps include condition based branching, waiting for a condition to occur, looping until a particular condition is satisfied, jumping out of a sequence or initiating another process instance. FIG. 12 shows a set of process steps that include waiting type flow control steps. FIG. 13 shows a set of process steps that include looping-type flow control steps.

Figures 14A, 14B:
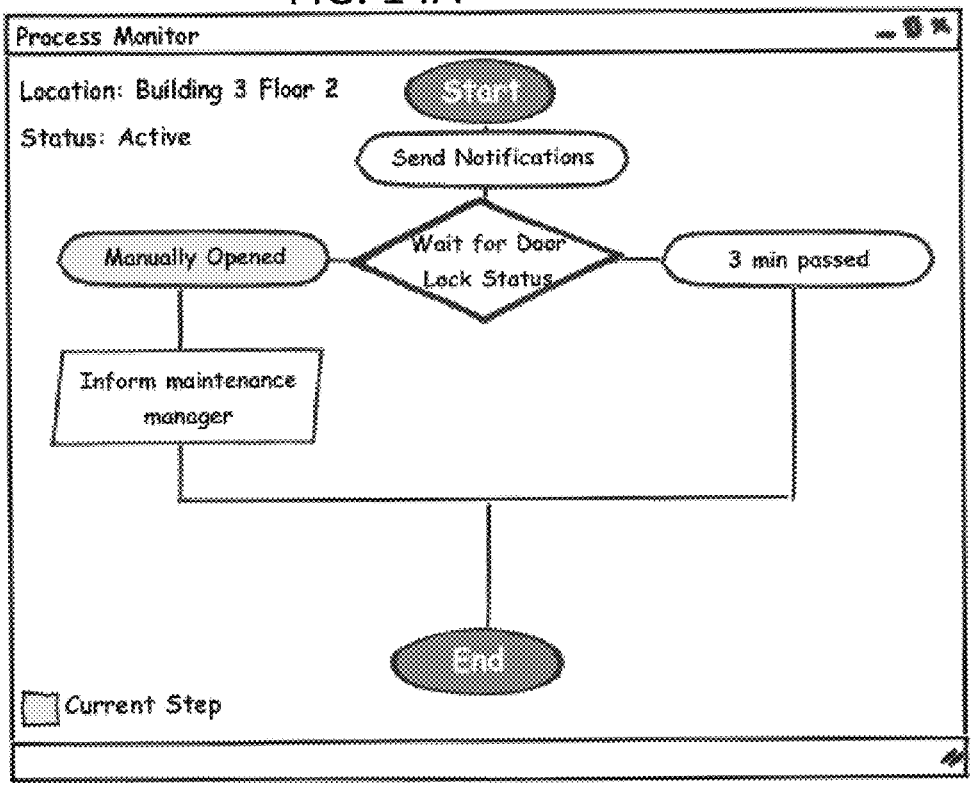
FIG. 14a is a representation of an active process list that might be presented to a user upon request for active processes.
FIG. 14b is a representation of a display that might be presented to a user upon a request for more detail as to the status of a particular active process.

Monitoring Process Instance, Recording Milestones, Generating and Presenting Process Statistics Process instances can be monitored visually with respect to the process definition. FIGS. 14a and 14b show an example of a list of active process (FIG. 14a), and a graphic showing the current or last executed step of a selected active process (FIG.

Figure 16:
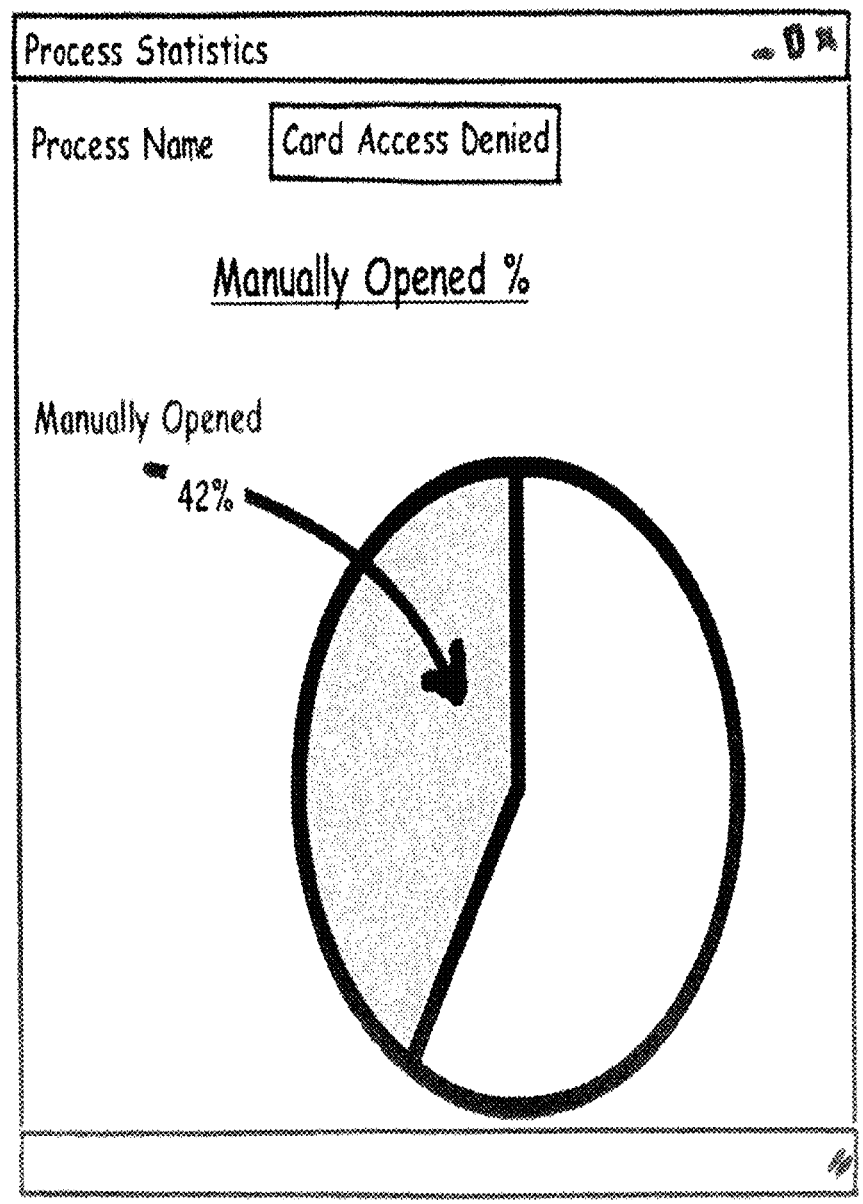
FIG. 16 is a representation of a graphical display that might be presented to a user to illustrate statistics relating to various processes.
Figure 17:
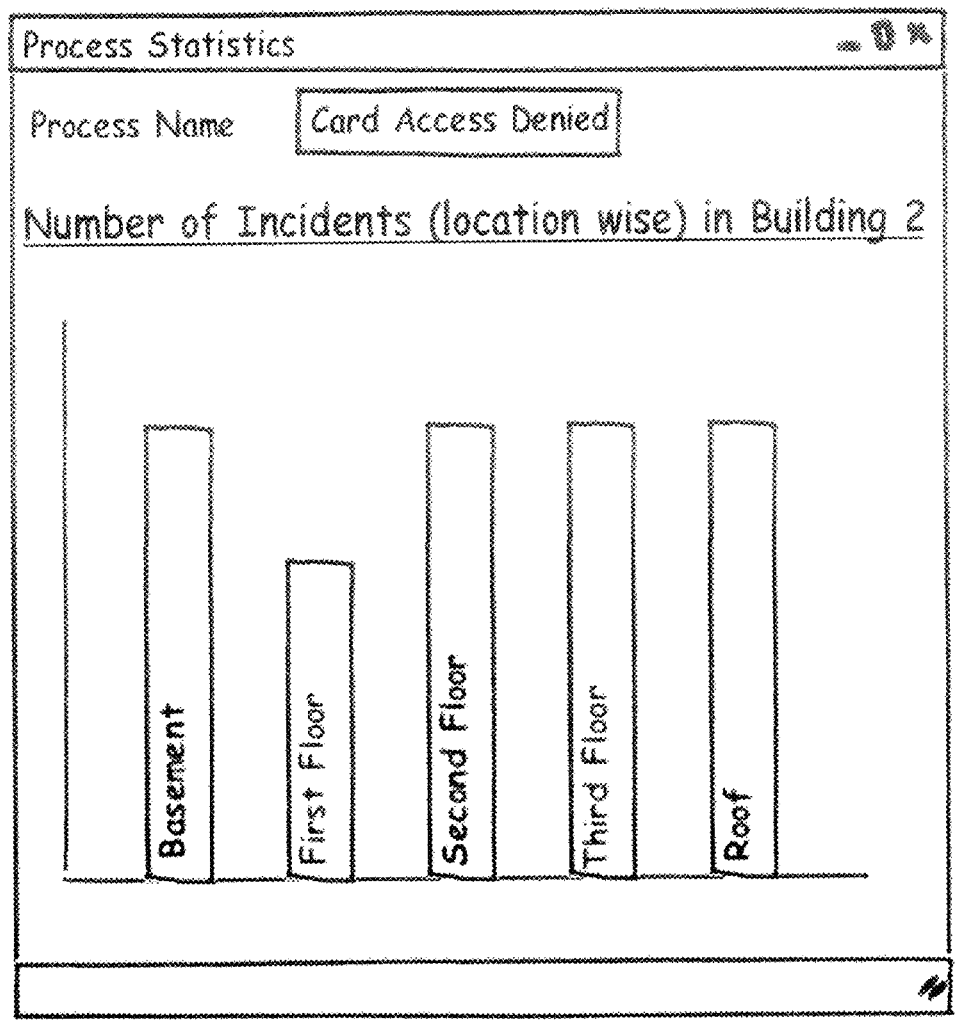
FIG. 17 is a representation of a different graphical display that might be presented to a user to illustrate statistics relating to various processes.

14*b*). As shown in FIG. 15, the system can record the details of the process instance ("milestones") for future analysis. Furthermore, after many process instances have been executed over time, the data from recorded milestones may be presented as "process statistics" for the user's analysis. Examples of such statistical presentations are shown in FIGS. 16 and 17.

What is claimed as new and desired to be protected by Letters Patent of the United States is:

1. A computer-implemented method for allowing a user to configure automated device or application responses in a first building system and at least one enterprise application, comprising providing a process management software module comprising an interface module configured to communicate with a portal layer and a process configuration software module accessible by a user via the interface module and which is configured to guide an end user through device selection and response process configuration; configuring the process configuration module to communicate with said first building system and said enterprise application, configuring said process management software module to be accessible over a network by end users, configuring said process configuration module to allow users to configure automated building system and enterprise application response processes using input from said first building system and said enterprise application, wherein said process configuration module is configured to store a configured process and execute process launch and process monitoring.

2. The computer-implemented method according to claim 1 wherein said first building system and said enterprise application were not installed together with an integrated control system.

3. The computer-implemented method according to claim 1 wherein said method allows a user to use data from enterprise applications as input for the control of a building system based on business requirements, and to revise the response features of building systems as business requirements change, and wherein said method further comprises configuring said process management software module to query an enterprise application during execution of a response process for input, which input is used according to said response process to determine subsequent response process steps.

4. The computer-implemented method according to claim 1, wherein the process management software module can be configured to communicate with additional and replacement building systems and enterprise applications that are added to the building after the process management software module is initially configured, without reconfiguring the entire control system.

5. The computer-implemented method according to claim 1, wherein the process management software module takes the data and control functions from a plurality of building systems and enterprise applications and allows a user to build a building process control system, and to edit the control processes at any time.

6. The computer-implemented method according to claim 1 wherein the building systems and enterprise applications are selected from the group consisting of HVAC, fire control, access control, video monitoring, public address, exterior lighting and signage, interior public and private space lighting, escalator and elevator systems, telephone systems, room scheduling/reservation systems, resource management systems, data and information technology systems, document management systems, e-mail servers, fax servers, SMS servers, building tenant/visitor database systems, and customer relationship/management systems.

7. The computer-implemented method according to claim 1 wherein the responses of building systems and enterprise applications are process driven and the response process is editable by the user.

8. The computer-implemented method according to claim 7 wherein the user can add or delete steps to the response process using a process design interface.

9. The computer-implemented method according to claim 1 wherein a different process may be configured for every device in a building system.

10. The computer-implemented method according to claim 1 wherein a first user may configure a first building system to respond in a first user's tenant space to a first event according to a first process and a second user may configure said first building system to respond in a second user's tenant space to said first event according to a second process.

11. The computer-implemented method according to claim 1 wherein the process management software module receives input from both value-oriented systems and transaction-oriented systems.

12. The computer-implemented method according to claim 1 wherein an end user may configure and customize building system response systems using input from both value-oriented and transaction-oriented systems.

13. The computer-implemented method according to claim 1 wherein the process management software module receives input from both building systems and enterprise applications.

14. The computer-implemented method according to claim 1 wherein the process management software module issues commands to building systems and enterprise applications.

15. The computer-implemented method according to claim 1 wherein the enterprise applications are selected from the group consisting of room scheduling/reservation systems, resource management systems, data and information technology systems, document management systems, e-mail servers, fax servers, SMS servers, building tenant/visitor database systems, and customer relationship/management systems.

* * * * *